US012681785B2

(12) United States Patent
Gao et al.

(10) Patent No.: US 12,681,785 B2
(45) Date of Patent: Jul. 14, 2026

(54) DYNAMICALLY ADJUSTED TIMEOUT VALUE FOR PROXY SERVER

(71) Applicant: International Business Machines Corporation, Armonk, NY (US)

(72) Inventors: Lei Gao, Xian (CN); Jin Wang, Xian (CN); A Peng Zhang, Xian (CN); Kai Li, Xian (CN); Matthew Wayne Howard, Racine, MN (US); Yu Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 18/457,435

(22) Filed: Aug. 29, 2023

(65) Prior Publication Data

US 2025/0077325 A1 Mar. 6, 2025

(51) Int. Cl.
*G06F 9/54* (2006.01)
*G06F 9/46* (2006.01)
(Continued)

(52) U.S. Cl.
CPC .............. *G06F 9/547* (2013.01); *G06F 9/466* (2013.01); *G06F 9/50* (2013.01); *H04L 41/147* (2013.01); *H04L 67/60* (2022.05)

(58) Field of Classification Search
CPC . G06F 9/466; G06F 9/50; G06F 9/547; H04L 6741/147; H04L 67/60; H04L 41/147
See application file for complete search history.

(56) References Cited

U.S. PATENT DOCUMENTS

| | | | |
|---|---|---|---|
| 10,841,231 | B2 | 11/2020 | Barnea et al. |
| 10,963,531 | B2 | 3/2021 | Shribman et al. |
(Continued)

FOREIGN PATENT DOCUMENTS

| | | |
|---|---|---|
| CN | 113590236 A | 11/2021 |
| JP | 2006146298 A | 6/2006 |

OTHER PUBLICATIONS

International Searching Authority, "Notification of Transmittal of the International Search Report and the Written Opinion of the International Searching Authority, or Declaration," Patent Cooperation Treaty, Oct. 30, 2024, 16 pages, International Application No. PCT/EP2024/070178.

(Continued)

*Primary Examiner* — Charles M Swift
(74) *Attorney, Agent, or Firm* — CANTOR COLBURN LLP; Jordan Schiller

(57) ABSTRACT

A method for dynamically adjusting a proxy server timeout includes identifying each microservice within a proxy server and mapping a topology of microservices, assigning each microservice to one of an application layer, a middleware layer and an infrastructure layer. Defining each representational state transfer (REST) application programming interface (API) calling relationship between each microservice and each other microservice. Determining a corresponding regression model defining a response time of each microservice based at least in part on a set of available response time predictors. Building a sequence model for at least one microservice in the application layer. Predicting an incoming REST API call and identifying a probable sequence model corresponding to the predicted incoming REST API call. Updating a timeout value of the predicted REST API call within the proxy server based on the sequentially predicted response times.

18 Claims, 5 Drawing Sheets

(51) Int. Cl.

| | |
|---|---|
| *G06F 9/50* | (2006.01) |
| *H04L 41/147* | (2022.01) |
| *H04L 67/10* | (2022.01) |
| *H04L 67/60* | (2022.01) |

(56) References Cited

U.S. PATENT DOCUMENTS

| | | | | |
|---|---|---|---|---|
| 11,563,636 | B1 | 1/2023 | Kairali et al. | |
| 12,572,396 | B2 * | 3/2026 | Odaira ...................... | G06F 9/54 |
| 2013/0311622 | A1 | 11/2013 | Gupta et al. | |
| 2017/0147394 | A1 | 5/2017 | Bates et al. | |
| 2018/0121226 | A1 * | 5/2018 | Liu ..................... | G06F 11/3051 |
| 2019/0007928 | A1 | 1/2019 | Di Girolamo et al. | |
| 2019/0057016 | A1 * | 2/2019 | Pasquini ................. | G06F 11/34 |
| 2019/0114417 | A1 * | 4/2019 | Subbarayan ............ | H04L 41/16 |
| 2021/0014221 | A1 | 1/2021 | Kukreja et al. | |
| 2024/0007492 | A1 * | 1/2024 | Shen .................. | H04L 63/1416 |

OTHER PUBLICATIONS

Yan et al., "Flowlet-level multipath routing based on graph neural network in OpenFlow-based SDN", Future Generation Computer Systems, vol. 134, 2022, pp. 140-153.

Nginx, "What is a Reverse Proxy Server" https://www.nginx.com/resources/glossary/reverse-proxy-server/ (Retrieved Jun. 1, 2023), 3 pages.

SolarWinds Worldwide, LLC, "HAProxy Logging—How to Tune Timeouts for Performance," https://www.papertrail.com/solution/tips/haproxy-logging-how-to-tune-timeouts-for-performance/ (Retrieved May 9, 2023), 7 pages.

* cited by examiner

200

Client(GUI or broswer)

Application layer services —— 202

Middleware layer services —— 204

Infrastructure layer services —— 206

250

300

| API | API called from down-stream services |
|---|---|
| Service_1_API_1 | Service_2_API_1 |
| Service_1_API_2 | Service_2_API_3, Service_3_API_1 |
| Service_1_API_3 | Service_3_API_2, Service_3_API_3 |
| Service_1_API_4 | N/A |
| ... | ... |

310

400

| Mem | CPU | ... | Network | Param 1 | Param 2 | ... | Call 1 | Call 2 | ... | Response time |
|-----|-----|-----|---------|---------|---------|-----|--------|--------|-----|---------------|
| 2 | 5 | ... | 4 | 3 | 4 | ... | 10 | 4 | ... | 23 |
| 3 | 4 | ... | 6 | 2 | 5 | ... | 2 | 5 | ... | 15 |
| 3 | 5 | ... | 7 | 7 | 8 | ... | 7 | 8 | ... | 17 |
| 7 | 8 | ... | 10 | 3 | 5 | ... | 3 | 5 | ... | 16 |
| 6 | 4 | ... | 10 | 5 | 8 | ... | 5 | 8 | ... | 28 |
| 5 | 8 | ... | 9 | 6 | 4 | ... | 6 | 4 | ... | 20 |
| ... | ... | ... | ... | ... | ... | ... | ... | ... | ... | ... |

Example: Sequence model for service 1 — 550

| Antecedent | Consequent | Confidence % |
|------------|------------|--------------|
| Service_1_API_1 | Service_1_API_2 | 87 |
| Service_1_API_1 | Service_1_API_3 | 82 |
| Service_1_API_2 | Service_1_API_3 | 81 |
| ... | ... | |

DYNAMICALLY ADJUSTED TIMEOUT VALUE FOR PROXY SERVER

BACKGROUND

The present invention generally relates to timeout values for services within a proxy server, and more specifically, to a dynamically adjusted timeout value for the proxy server.

Interconnected computer systems and programs frequently utilize applications and software that may call on other applications or other software within the interconnected system using proxy servers. In such examples a call is provided to the interconnected system for the related information. In order to prevent indefinite waiting times when an error occurs, timeout values are applied to the request. When the request has been pending for a duration in excess of the timeout value, the request is canceled and an error can be reported back. When a given call is particularly complex, it may not be possible to complete the request prior to the expiration of the timeout value when the timeout value is set at too short a duration. Conversely, when an error does occur a timeout value that is set too long can result in a substantial delay before an error is reported when an error is present.

SUMMARY

Embodiments of the present invention are directed to a computer-implemented method for dynamically adjusting a timeout value in a proxy server. A non-limiting example of the computer-implemented method includes dynamically adjusting a proxy server timeout includes identifying each microservice within a proxy server and mapping a topology of microservices within the proxy server, assigning each microservice to one of an application layer, a middleware layer and an infrastructure layer of the proxy server. Defining each representational state transfer (REST) application programming interface (API) calling relationship between each microservice and each other microservice within the proxy server. Determining, for each microservice in the proxy server, a corresponding regression model defining a response time of each microservice based at least in part on a set of available response time predictors. Building a sequence model for at least one microservice in the application layer. Predicting an incoming REST API call and identifying a probable sequence model corresponding to the predicted incoming REST API call. Sequentially predicting a response time corresponding to each microservice in the sequence using the corresponding regression model. Updating a timeout value of the predicted REST API call within the proxy server based on the sequentially predicted response times. The method can be performed using a computerize system, stored on a memory storage device, or using a distributed computing system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
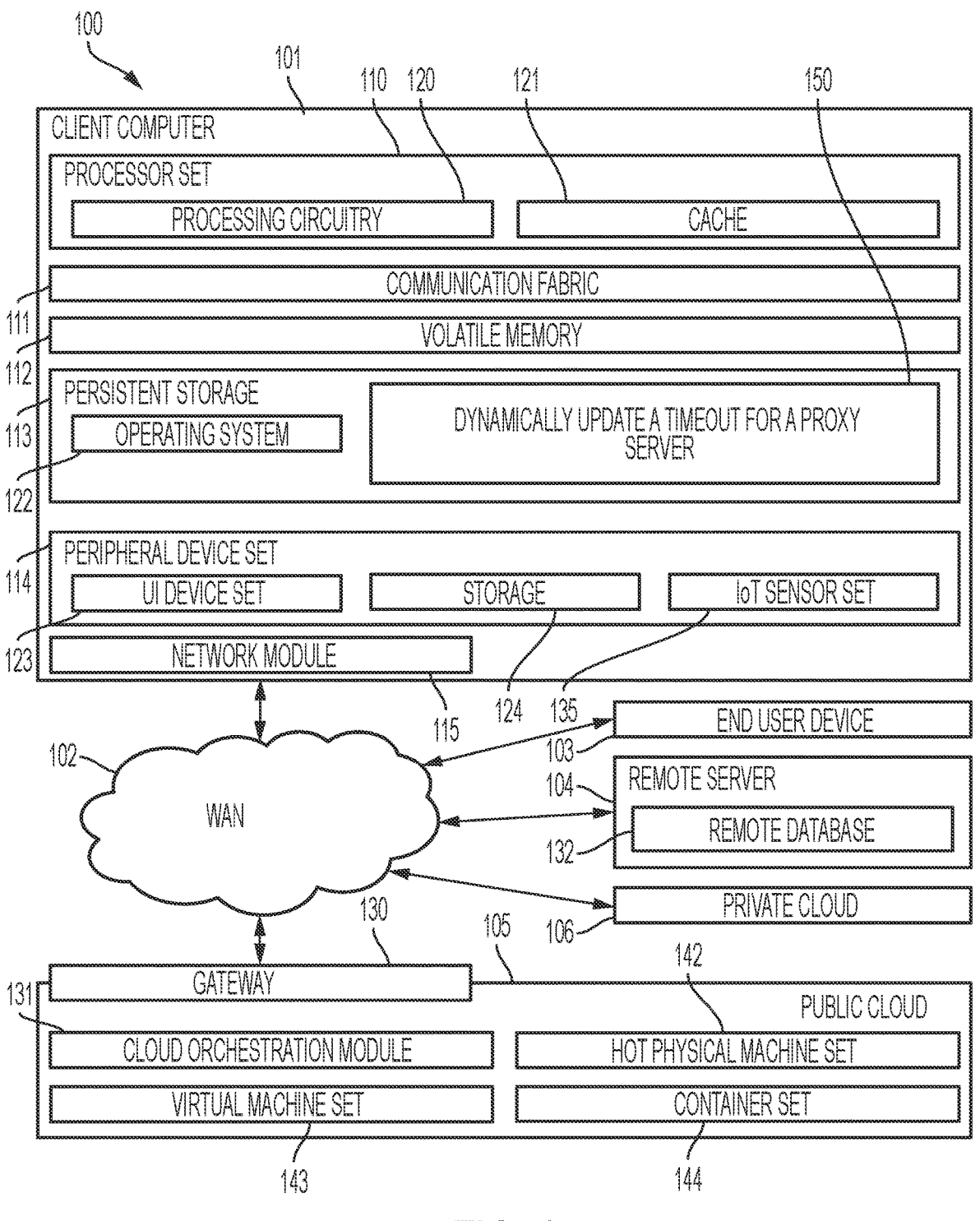
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Computing environment 100 contains an example of an environment for the execution of at least some of the computer code involved in performing the inventive methods, such as dynamically updating a timeout time for a proxy server at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 132, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 132, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Turning now to an overview of technologies that are more specifically relevant to aspects of the invention, a proxy server is a go-between or intermediary server that forwards requests for content from multiple clients to different servers across the Internet. A reverse proxy server is a type of proxy server that typically sits behind the firewall in a private network and directs client requests to the appropriate back-end server. A reverse proxy provides an additional level of abstraction and control to ensure the smooth flow of network traffic between clients and servers. Common uses for a reverse proxy server include, among other things, load balancing, web acceleration, and security and anonymity Typically, users need to set a request timeout for each microservice in the network to avoid waiting for a long time if any problems are happening in the server. For example, By default, NGINX (a popular proxy server) default request timeout is 60 seconds. The request timeout defines a duration that a microservice will wait for a response form the proxy server. After the duration is exceeded the microservice provides a "504: Gateway Timeout" error and will respond as defined within that service. The particular default response is dependent on the service, and the types of default responses are conventional. NGINX is used herein as an exemplary proxy server, and it is appreciated that the concepts described herein are general to all proxy servers and are not limited in application to NGINX based proxy servers.

In some instances, a request or type of request may inherently exceed the default, or set, request timeout regardless of how quickly the proxy server is able to respond to the request. These requests are referred to as "long-running request". In such examples, a user may need to increase request timeout in NGINX to serve long-running requests. If user does not increase request timeout value NGINX will give "504: Gateway Timeout" Error.

Typically, the timeout value is a fixed value in the configuration file of proxy server. Once the timeout value is set for the service, the timeout value is fixed for all API requests of the service. The set timeout values are not flexible, because there are too many and complex user scenario in a real network implementation, and every implementation is affected by dependencies to the infrastructure layer services, hardware resources, request parameters, etc.

If user sets a small value for the timeout, the user may often encounter 504 errors. If the user set a very large value for the timeout, the user may wait a long time for the REST API response when there is error happening in the service. Setting a proper timeout value in the configuration always depends on the experience of the engineers.

To overcome the current drawback, the system disclosed herein uses an intelligent method to dynamically adjust the timeout value for reverse proxy, which can be used in a complex product constructed by massive microservices.

Turning now to an overview of the aspects of the invention, one or more embodiments of the invention address the above-described shortcomings of the prior art by providing an intelligent method to dynamically adjust the timeout value for reverse proxy, which can be used in a complex product constructed by massive microservices. In general, the system builds a dependency topology for all microservices, according to the REST API call relationship among the microservices. simultaneously, the system identifies the application layer services, middleware layer services and infrastructure layer services and builds a regression model for response time corresponding to each REST API in a microservice.

Turning now to a more detailed description of aspects of the present invention, in some examples, a sequence model is built in each application layer service, according to the historical data about REST API call sequence. The process predicts the probability of a coming REST API call in each application microservice of a product environment, based on the latest REST API call, and searching the down-stream services in the topology according to the predicted REST API call. The process further predicts the response time using the regression model to update the timeout value for each microservice in the topology from bottom layer services up to the top layer services layer by layer. This process is controlled by an on-demand timer. Thus, the process provides an automatic and dynamic determination of the timeout value of each service, and updates the proxy server with a proper value according to the determined timeout value.

Advantageously, this process allows for building a dependency topology for all microservices, according to the REST API call relationship among the microservices. Meanwhile, identify the application layer services, middleware layer services and infrastructure layer services.

Figures 2, 3:
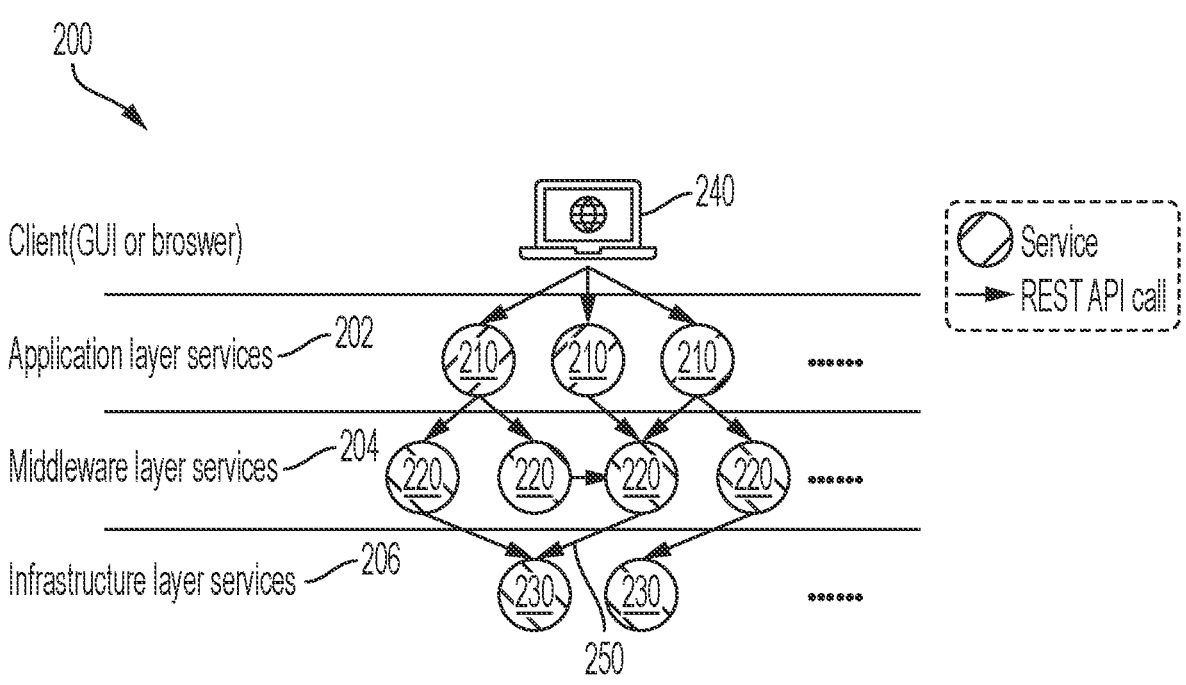
FIG. 2 depicts a microservice topology within a proxy server according to one example.
FIG. 3 depicts an exemplary dependency table for one service.

With continued reference to the computing system of FIG. 1, FIGS. 2-8 illustrate the process described generally above according to one particular implementation. Initially, a dependency topology 200 (illustrated in FIG. 2). Within the dependency topology each microservice (alternately referred to as microservice) 210, 220, 230 is classified into one of an application services layer 202, which interfaces with a graphical user interface (GUI) 240, a middleware layer 204, which interfaces with one or more services in the application services layer 202, and an infrastructure layer 206 which interfaces with one or more services in the middleware layer 204. As illustrated in the example of FIG. 2, each microservice 210, 220, 230 interfaces with one or more other services 210, 220, 230 or the GUI 240 via a REST API call 250.

Once the dependency topology is determined, the dependency for a given REST API among the services 210, 220, 230 is determined. Each microservice 210, 220, 230 provides multiple REST APIs 250. When a REST API 250 is executed inside a microservice 210, 220, 230, the microservice 210, 220, 230 calls one or more REST APIs 250 from other services 250. The dependencies are used to create a dependency table 300 for each microservice 210, 220, 230. FIG. 2 illustrates an exemplary dependency table for application services 210, 220, 230. It is appreciated that a practical implementation will include substantially more services 210, 220, 230 in each layer 202, 204, 206. By way of example one practical implementation may include at least services 210, 220, 230 per layer.

The dependency table 300 identifies the REST API 250 call relationship with other (down-stream) services 210, 220, 230. For infrastructure layer services 230, the value of API called from down-stream services should be not applicable (N/A) 310, because it should not call any REST API from other services 210, 220, 230.

For each REST API in the microservice 210, 220, 230, information from historical deployment and execution (referred to herein s historical data) is collected related to real-time resources 410 such as available memory, disk usage, CPU usage, network throughput, etc. Similarly, as the microservice 210, 220, 230 is deployed in either a physical machine or a virtual machine, parameter information 420 about the REST API, such as query parameters, headers, body, etc. is collected. Historical time 430 consuming of the REST API call downstream is collected, and the response time 440 of this REST API call are collected. The historical data is collected in a historical data table 400, one example of which is illustrated in FIG. 4.

Figure 4:
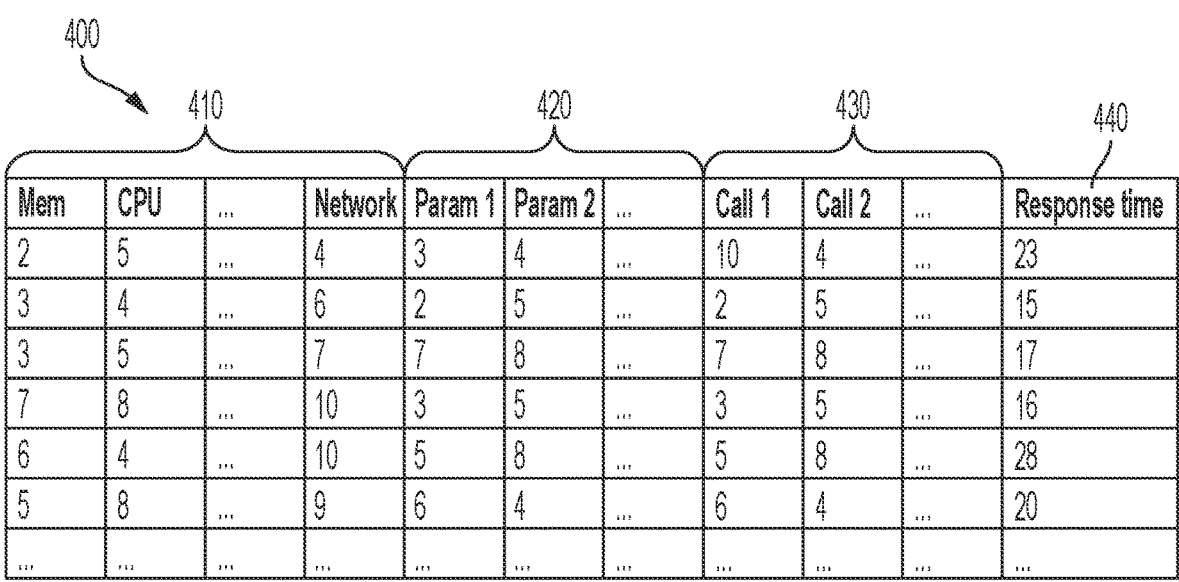
FIG. 4 depicts and example historical data table.

The historical data collected in the table 400 illustrated in FIG. 4 is used to Build a regression model against the data for the REST API, using response time as a target. Predictors for the regression model include real-time resources 410, Parameter info about the REST API 420, and the time 430 consuming of the REST API call in the downstream. There is no time consuming of the REST API call in the down-stream columns for infrastructure layer 206 services 230, because it is assumed infrastructure layer 206 services 230 should not further call any REST API from other services.

Figure 5:
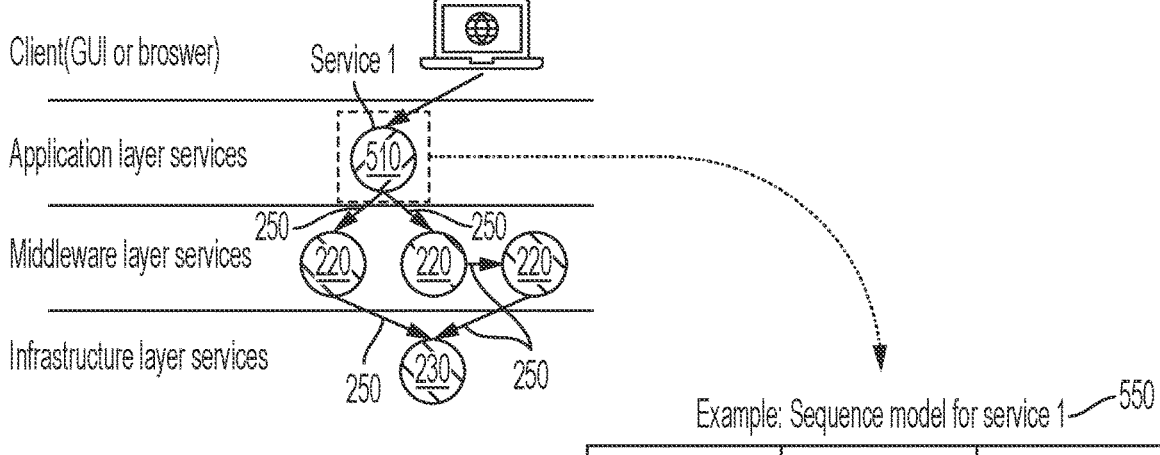
FIG. 5 depicts one example sequence model for an application layer microservice which can have multiple Representational State Transfer (REST) Application Programming Interface (API) calls.

After the regression model is constructed, a sequence model is constructed for each application layer microservice 210, 220, 230 based on the historical data about REST API call sequence. FIG. 5 illustrates one example sequence model 550 for an application layer 202 microservice 510 which can have multiple REST API calls 250. The sequence model 550 includes a distinct row for each possible permutation of REST API calls 250, and a confidence value for the occurrence of the permutation.

Figure 6:
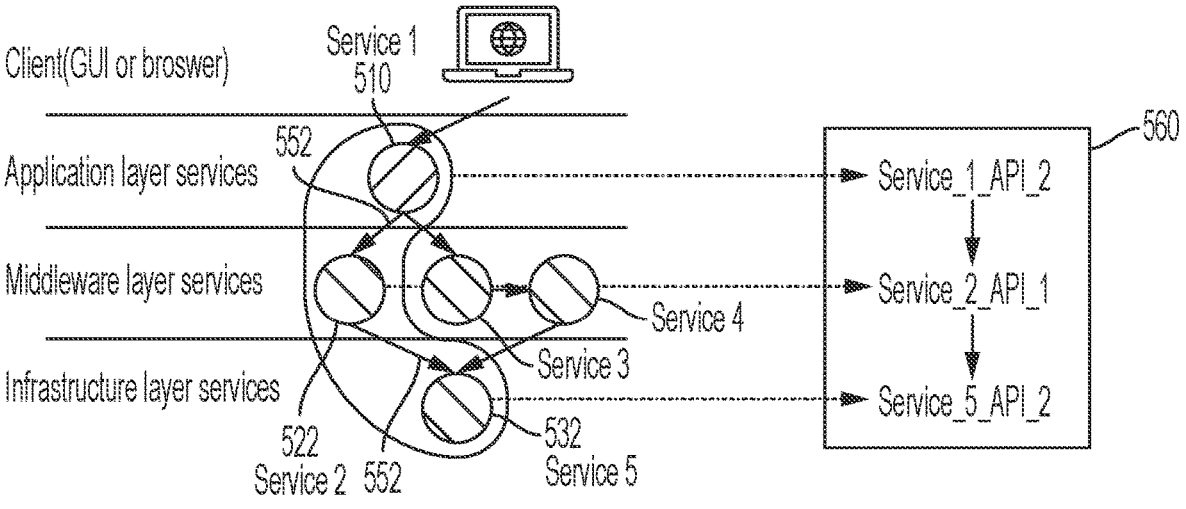
FIG. 6 depicts a dynamic timeout system implemented within a production environment according to one example.

When the system is implemented within a production environment, as illustrated in FIG. 6, each time an application microservice 510 is used the system predicts the probability of coming REST API calls based on the regression model 550. the predicted REST API call(s) are then used to search down-stream services within the topology and determine the likely REST API call stack 560. As used herein the REST API call stack refers to the sequence of REST API calls required to complete the utilization of the application microservice 510.

Figure 7:
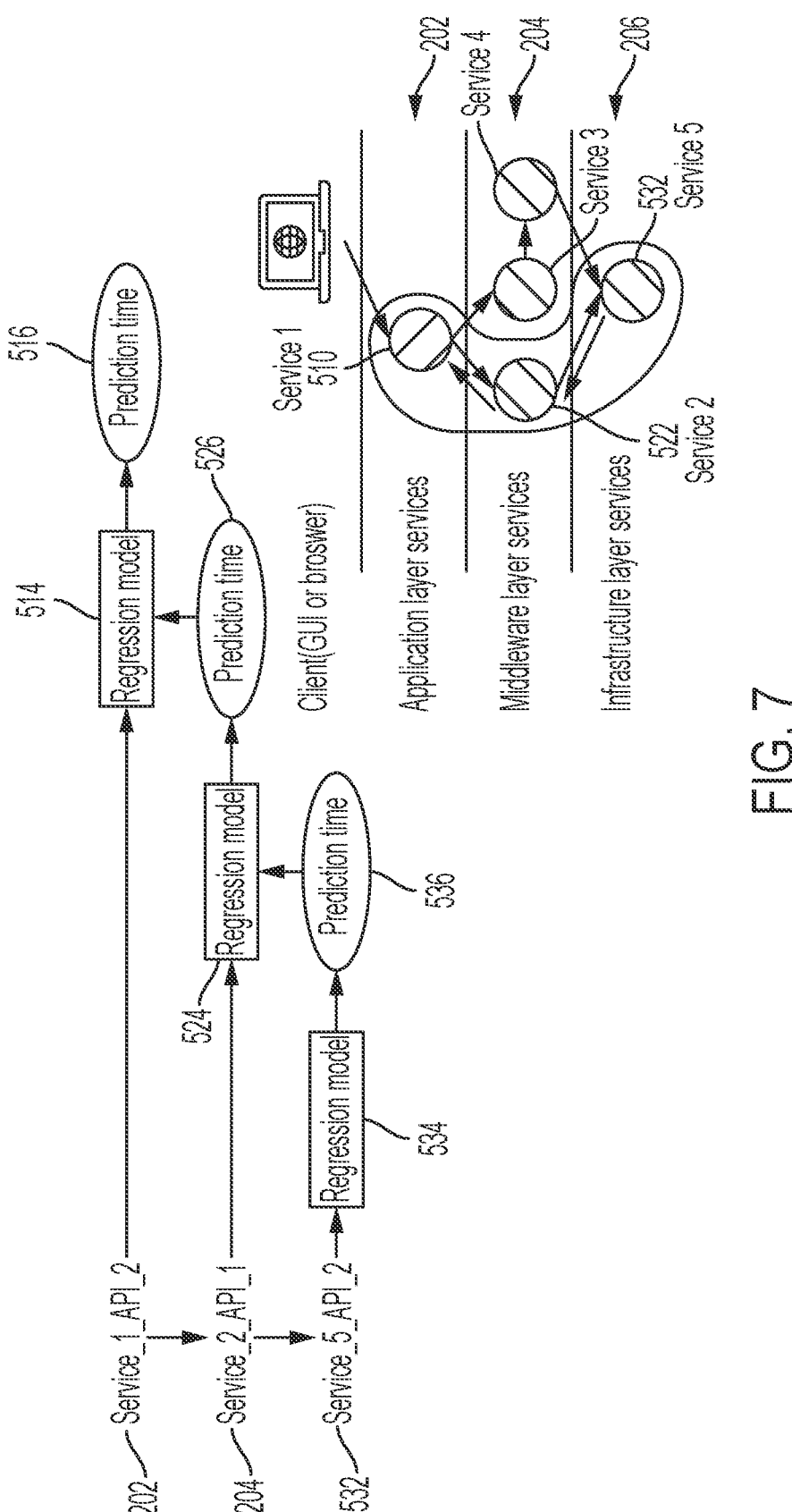
FIG. 7 depicts an example time prediction for a sequence of application services.

Once the likely REST API call stack 560 is identified, the response time of each microservice 510, 522, 532 in the stack 560 is determined using the identified regression model. FIG. 7 illustrates an example operation where the response times are determined initially with the microservice 532 in the bottom layer (infrastructure services 206), then the microservice 522 in the middle layer (middleware services 204) and finally the microservice 510 in the top (application services 202) layer. At each layer 202, 204, 206, the corresponding regression model 534, 524, 514 determines a predicted time 536, 526, 516. Each layer 202, 294, 206 provides the corresponding predicted time 516, 526, 536 to the next layer up, and the predicted time 536, 526 form the layer down is used in the regression model 524, 514. By way of example, the middleware services 204 layer receives the predicted time 536 from the infrastructure services layer 206 and uses the predicted time 536 in its regression model 524 to determine the middleware services layer predicted time 526. The sequential time prediction results in a total time prediction output (predicted time 516) from the application services layer 202 that considers the likely time of each microservice 510, 522, 532 in the predicted sequence.

In some examples, the process outlined in FIG. 7 is repeated for each possible application REST API call sequence. In other examples, the process is repeated only for REST API call sequences that have a probability of occurring above a specified likelihood. In you other examples, the process is only run for the most likely, or the N most likely, sequences.

Finally, the timeout value of each microservice is updated with a value based on the predicted time, rather than based on an arbitrary setting or a default timeout setting for the proxy server. The process is, in some examples, controlled by a timer on-demand and automatically executed for all Application layer services. When used, in every service, there is a determined list of prediction time to different REST APIs, and the maximum value among all the REST APIs is set as the timeout value of the services.

The above descried system provides an intelligent method to dynamically adjust the timeout values for reverse proxy in a complex product constructed by massive microservices by applying artificial intelligence (AI) methods to adjust the timeout value based on learned prior timeouts.

The above-described aspects of the invention address the shortcomings of the prior art by advantageously allowing a dynamic adjustment to the timeout value for reverse proxy servers, with the adjustment accounting for historical times to create a predict timeout value. The predicted timeout value provides an intelligent way and update the timeout value for all the services with a different value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet microservice Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
identifying, using a computer processor, each microservice within a proxy server and mapping a topology of microservices within the proxy server, the topology including each microservice within the proxy server and each representational state transfer (REST) application programming interface (API) calling relationship between each microservice and each other microservice, and wherein the topology identifies one of an application layer, a middleware layer, and an infrastructure layer corresponding to each microservice;
determining, using the computer processor, a regression model corresponding to each microservice, the regression model defining a response time of each microservice based at least in part on a set of available response time predictors;
building a sequence model for at least one microservice corresponding to the application layer;
predicting an incoming REST API call and identifying a probable sequence model corresponding to the predicted incoming REST API call using the computer processor;
sequentially predicting a response time corresponding to each microservice in the sequence using the corresponding regression model by initially predicting the response time of the last microservice in the sequence, and providing the predicted response time of the last microservice in the sequence to a regression model of an immediately prior microservice in the sequence, and iterating the response time prediction from the last microservice in the sequence to the first microservice in the sequence; and
updating, using the computer processor, a timeout value of the predicted REST API call within the proxy server based on the sequentially predicted response times.

2. The computer-implemented method of claim 1, wherein the set of available response time predictors includes real-time resources, REST API parameter information, and a downstream time duration of the REST API call.

3. The computer-implemented method of claim 1, wherein building a sequence model for at least one microservice corresponding to the application layer comprises building a sequence model for each microservice corresponding to the application layer.

4. The computer-implemented method of claim 3, wherein each sequence model is constructed by the processor according to historical data.

5. The computer-implemented method of claim 4, wherein the historical data includes available memory, disk usage, CPU usage, network throughput of the proxy server.

6. The computer-implemented method of claim 1, wherein the first microservice in the sequence corresponds to the application services layer.

7. A method comprising:
identifying each microservice within a proxy server and mapping a topology of microservices within the proxy server, assigning each microservice to one of an application layer, a middleware layer and an infrastructure layer of the proxy server;
defining each representational state transfer (REST) application programming interface (API) calling relationship between each microservice and each other microservice within the proxy server;
determining, for each microservice in the proxy server, a corresponding regression model defining a response time of each microservice based at least in part on a set of available response time predictors;
building a sequence model for at least one microservice in the application layer;
predicting an incoming REST API call and identifying a probable sequence model corresponding to the predicted incoming REST API call;
sequentially predicting a response time corresponding to each microservice in the sequence using the corresponding regression model by predicting the response time corresponding to each microservice in the sequence comprises initially predicting the response time of the last microservice in the sequence, and providing the predicted response time of the last microservice in the sequence to a regression model of an immediately prior microservice in the sequence, and iterating the response time prediction from the last microservice in the sequence to the first microservice in the sequence; and
updating a timeout value of the predicted REST API call within the proxy server based on the sequentially predicted response times.

8. The method of claim 7, wherein the set of available response time predictors includes real-time resources, REST API parameter information, and a downstream time duration of the REST API call.

9. The method of claim 7, wherein building a sequence model for at least one application layer microservice comprises building a distinct sequence model for each application layer microservice.

10. The method of claim 9, wherein each sequence model is constructed according to historical data.

11. The method of claim 10, wherein the historical data includes available memory, disk usage, CPU usage, network throughput of the proxy server.

12. The method of claim 7, wherein the first microservice in the sequence corresponds to the application services layer.

13. A system comprising:

a plurality of interconnected computational systems including at least one proxy server containing a plurality of microservices;

each microservice with the proxy server being assigned to one of an application service layer, a middleware service layer, and an infrastructure layer;

a computer processor configured to dynamically update a timeout value corresponding to each application layer microservice of the proxy server by:

mapping a topology of the microservices within the proxy server;

defining each representational state transfer (REST) application programming interface (API) calling relationship between each microservice and each other microservice within the proxy server;

determining, for each microservice in the proxy server, a corresponding regression model defining a response time based at least in part on a set of available response time predictors;

building a sequence model for at least one microservice in the application layer;

predicting an incoming REST API call and identifying a probable sequence model corresponding to the executing the predicted incoming REST API call;

sequentially predicting a response time corresponding to each microservice in the sequence using the corresponding regression model by initially predicting the response time of the last microservice in the sequence, and providing the predicted response time of the last microservice in the sequence to a regression model of an immediately prior microservice in the sequence, and iterating the response time prediction from the last microservice in the sequence to the first microservice in the sequence; and updating a timeout value of the predicted REST API call within the proxy server based on the sequentially predicted response times.

14. The system of claim 13, wherein the set of available response time predictors includes real-time resources, REST API parameter information, and a downstream time duration of the REST API call.

15. The system of claim 13, wherein building a sequence model for at least one application layer microservice comprises building a distinct sequence model for each application layer microservice.

16. The system of claim 15, wherein each sequence model is constructed according to historical data.

17. The system of claim 16, wherein the historical data includes available memory, disk usage, CPU usage, network throughput of the proxy server.

18. A computer program product comprising:

a non-transitory computer readable medium storing instructions for causing a processor to implement a dynamic microservice timeout update method within a proxy server, the method comprising:

identifying each microservice within a proxy server and mapping a topology of microservices within the proxy server, assigning each microservice to one of an application layer, a middleware layer and an infrastructure layer of the proxy server;

defining each representational state transfer (REST) application programming interface (API) calling relationship between each microservice and each other microservice within the proxy server;

determining, for each microservice in the proxy server, a corresponding regression model defining a response time of each microservice based at least in part on a set of available response time predictors;

building a sequence model for at least one microservice in the application layer;

predicting an incoming REST API call and identifying a probable sequence model corresponding to the predicted incoming REST API call;

sequentially predicting a response time corresponding to each microservice in the sequence using the corresponding regression model by initially predicting the response time of the last microservice in the sequence, and providing the predicted response time of the last microservice in the sequence to a regression model of an immediately prior microservice in the sequence, and iterating the response time prediction from the last microservice in the sequence to the first microservice in the sequence; and updating a timeout value of the predicted REST API call within the proxy server based on the sequentially predicted response times.

* * * * *